United States Patent Office 3,282,945
Patented Nov. 1, 1966

3,282,945
2'-QUATERNARIES IN THE SYNTHESIS OF EMETINE, 2-DEHYDROEMETINE AND RELATED COMPOUNDS
Alexander Crawford Ritchie, Harrow, and Dennis Edward Clark, Windsor, England, Rupert Frederick Keith Meredith, Glamorgan, Wales, and Keith Desmond Eric Whiting, Brookmans Park, England, assignors to Glaxo Laboratories Limited, Greenford, England, a British company
No Drawing. Filed Sept. 27, 1962, Ser. No. 226,745
Claims priority, application Great Britain, Oct. 2, 1961, 35,554/61
13 Claims. (Cl. 260—288)

This invention concerns novel intermediates of use in the synthesis of emetine, 2-dehydroemetine and related compounds, and two processes for their preparation.

Copending U.S. Patent application Serial No. 40,200, now issued on February 18, 1964 as Patent No. 3,121,720 describes the preparation of compounds of the skeletal Formula I

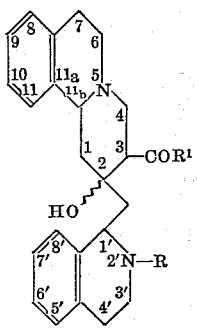

where $R^1$ is an organic group such as an aliphatic, araliphatic or aryl group, preferably a lower alkyl group such as a methyl group, and R is a group $CH_2CH_2COR^1$ where $R^1$ has the above meaning, by ring closure of compounds of the skeletal Formula II

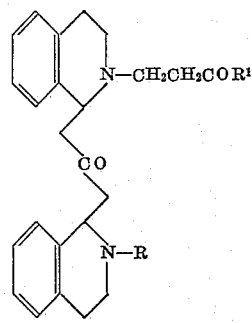

where $R^1$ and R have the above meanings. In general, the fact that the groups attached to the N-atoms in compounds of skeletal Formula II are similar simplifies the initial stages of the synthesis.

The compound of Formula I may be used in the synthesis of emetine and related compounds by methods involving dehydration to form a 2(3)-double bond and reduction of this bond, reduction of the 3-acyl group to a substituted or unsubstituted alkyl group and reduction or removal of the group R. Such methods are generally complicated by requiring selective reductions of the groups —$COR^1$ or R, particularly in the synthesis of 2-dehydroemetine.

Copending U.S. patent application Serial No. 111,908, now issued on October 1, 1963 as U.S. Patent No. 3,105,835 describes the production of compounds of skeletal Formula I in which R is a group other than $CH_2CH_2COR^1$, such as an alkyl, aralkyl or aryl group, by ring closure of the corresponding compound of skeletal Formula II. This method possesses the advantage that the groups $COR^1$ and R do not generally undergo similar reactions, as is the case when R is a group $CH_2CH_2COR^1$, so simplifying the final stages of the overall synthesis of emetine and its analogues. On the other hand, the preparation of compounds of skeletal Formula II in which R is other than —$CH_2CH_2COR^1$ is more complicated than when the side chains are identical since it is then not possible to attach the chains simultaneously.

It is an object of the present invention to provide simplified methods for the synthesis of emetine and related compounds, more particularly by utilizing the simpler initial stages of application Serial No. 111,908 in which R is $CH_2CH_2COR^1$ together with the simpler final stages of the process of application S.N. 111,908 in which R is a different group having no ketonic grouping.

We have found that the compounds of skeletal Formula I, and also related compounds having the 2-(isoquinol-1-yl-methyl)-benzoquinolizine structure, which possess a group $CH_2CH_2COR^1$ attached at the isoquinoline nitrogen atom can be converted into mono-quaternary derivatives having a further group such as an aliphatic or araliphatic group at the isoquinoline nitrogen and that such quaternary compounds can be decomposed to yield compounds in which the group $CH_2CH_2COR^1$ of said compounds is removed, leaving the quaternizing group alone at the 2'-position. Thus, the group R where this is $CH_2CH_2COR^1$, can be replaced e.g. by a benzyl group, in compounds of skeletal Formula I or derivatives of these compounds in which the group $COR^1$ has been reduced to $CH_2R^1$, or in dehydrated $\Delta^{2(3)}$-derivatives of the last-mentioned compounds or their dihydro-derivatives or in compounds of Formula I in which the 2-hydroxy group is replaced by hydrogen, to yield products which are particularly suitable for conversion to emetine and its analogues. In particular, where the group —$COR^1$ is present in the 3-position its subsequent reduction is not complicated by the presence of the oxo-group of the group $CH_2CH_2COR^1$.

According to the present invention, therefore, we provide quaternary compounds having cations of the skeletal Formula III

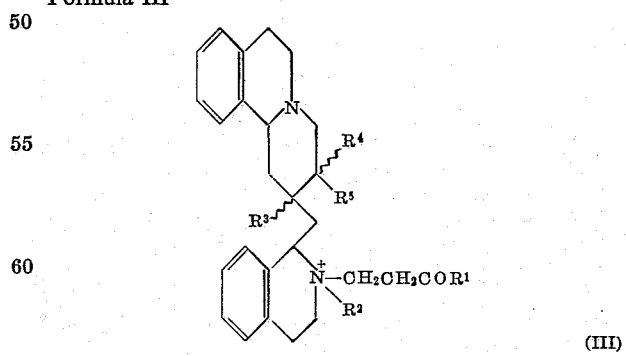

in which $R^1$ has the above meaning, $R^2$ is an aliphatic, araliphatic or aryl group, $R^3$ is a hydrogen atom or a hydroxyl group, $R^4$ is a hydrogen atom or $R^3$ and $R^4$ together represent a carbon-carbon bond and $R^5$ is a group $COR^1$ or $CH_2R^1$ ($R^4$ being a hydrogen atom when $R^5$ is a group $COR^1$, with one or more anions.

The anions associated with the cations of Formula III will in general be those deriving from the compounds used in quaternization, e.g. halide, sulphate or p-toluene sulphonate ions, but other anions can be present, e.g. perchlorate, phosphate ions etc. The group $R^1$, as indicated above, may be an aliphatic, araliphatic or aryl group, for example, a lower alkyl, phenyl or benzyl group, but is preferably a methyl group since the group —$COR^1$ can then be reduced to the ethyl group present at the 3-position of emetine. The group $R^2$ is preferably an arylmethyl group such as a benzyl group since this may be removed conveniently by hydrogenolysis to yield N-unsubstituted compounds, or an alkyl or hydroxyalkyl group having 1–7 carbon atoms since such groups are found to reduce unwanted side effects in emetine and 2-dehydroemetine. $R^2$ may also advantageously be an alkenyl group such as an allyl group, since such groups are often more easily introduced by quaternization than saturated groups and, furthermore, may be reduced to such saturated groups. $R^4$ is preferably a hydrogen atom and $R^3$ a hydroxyl group, since it is preferred to effect the exchange of the group R at the stage involving compounds of skeletal Formula I. $R^5$ is preferably a group $COR^1$ since it is preferred to effect reduction of this group after the 2′-oxoalkyl group has been replaced.

The compounds of skeletal Formula III may be variously substituted and the 6, 7, 8, 9, 10, 11, 3′, 4′, 5′, 6′, 7′ and/or 8′ positions may carry such substituents as alkyl, aralkyl, aryl, ether or tertiary amino groups e.g. methyl, ethyl, propyl, isopropyl, butyl, amyl, benzyl, phenyl, methoxy, ethoxy, propoxy, butoxy, benzyloxy, phenoxy or dialkylamino groups. Where the substituents are alkoxy groups, such groups preferably contain 1 to 5 carbon atoms. Substituents may also occupy more than one position as in methylenedioxy groups. Preferably, the 6′, 7′, 9 and 10 positions carry methoxy groups, the remaining positions being unsubstituted since this substitution is present in emetine itself.

The compounds of skeletal Formula III may be prepared by reacting a compound of the skeletal Formula IV

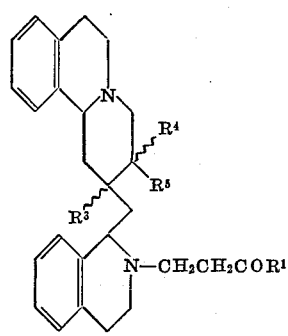

(IV)

with a compound $R^2X$ where $R^1$, $R^2$, $R^3$, $R^4$ and $R^5$ have the above meanings and X is an anion-forming atom or group such as a halogen atom or a sulphate or p-toluenesulphonate group. The quaternization may be effected in the presence of an inert solvent, such as an aromatic hydrocarbon solvent, e.g. benzene, toluene etc., a halogenated hydrocarbon solvent, e.g. methylene dichloride, chloroform etc., or other substituted hydrocarbons such as acetonitrile or nitromethane etc. Since there is a second tertiary nitrogen atom in the molecule, the quaternization should not be effected too vigorously, for example at high temperatures and using a large excess of quaternizing reagent, since reaction might then take place at both nitrogen atoms.

The decomposition of the mono-quaternary compounds of skeletal Formula III may be effected in acidic solution e.g. alkanolic mineral acid such as ethanolic hydrogen chloride or sulphuric acid, or even in neutral solution. Preferably however basic solutions are employed, e.g. using an organic or inorganic base such as an alkali metal or ammonium hydroxide, carbonate, bicarbonate, hydrazine etc. or an organic basic substance, e.g. a basic resin or an amine such as methylamine, conveniently in aqueous organic solvents such as water-miscible ketones, ethers, alkanols etc., e.g. acetone, dioxane, methanol etc. Decomposition may also be effected by heating, for example, by refluxing in water or organic solvents such as methanol, ethanol etc. or even by standing at room temperature in an aqueous alcohol e.g. aqueous methanol.

The decomposition products, which have the skeletal formula

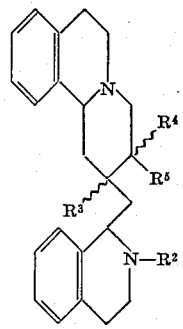

(V)

where $R^2$, $R^3$, $R^4$ and $R^5$ have the above meanings, may be used as intermediates in the synthesis of emetine and related compounds according to the methods described in our copending applications referred to above.

Where $R^3$ is a hydroxyl group and $R^4$ is a hydrogen atom, the compounds may be dehydrated, for example by treatment with a mineral acid such as hydrochloric or sulphuric acid, to form compounds in which $R^3$ and $R^4$ together represent a carbon-carbon bond.

The reduction of the 2(3)-unsaturation, where $R^3$ and $R^4$ together represent a carbon-carbon bond, may be effected, when the group $R^5$ is an acyl group, by reaction with an alkali metal or alkaline earth metal/ammonia reducing system e.g. lithium or calcium in liquid ammonia.

The reduction of the group $COR^1$, where $R^5$ represents such a group, requires different reducing systems when 2(3)-unsaturation is present and when it is absent. Thus, for example, when $R^3$ is hydrogen and $R^4$ is hydrogen, the group $COR^1$ may be reduced by Wolff-Kishner reducing agents or by conversion into a thioketal derivative such as the ethylene thioketal and reduction of this by Raney nickel or hydrazine and alkali. Where $R^3$ is hydroxyl, however, Wolff-Kishner reagents appear to be ineffective. On the other hand, where $R^3$ and $R^4$ together represent a carbon-carbon bond, the conjugated carbonyl group can then advantageously be converted into a thioketal group and this reduced with Raney metal or an alkali metal or alkaline earth metal/ammonia reducing system. Sodium in liquid ammonia in the presence of tetrahydrofuran has been found to be particularly effective.

The conjugated carbonyl group may also be conveniently reduced to a methylene group by the method described in copending U.S. patent application Serial No. 218,137, that is, by first reducing the carbonyl group to a secondary alcohol group, followed by acylation of the hydroxyl groups to form an ester and treatment of the ester with a metal/ammonia or metal/primary amine reducing system.

Where the group $R^2$ is an arylmethyl group such as a benzyl group, this may conveniently be removed by hydrogenolysis to yield the corresponding N-unsubstituted derivative, after the reduction of the group —$COR^1$ has been effected. Noble metal hydrogenation catalysts such as platinum, palladium etc. are convenient hydrogenation catalysts, preferably as supported catalysts such as palladized charcoal. Suitable solvents include alkanols such as ethanol, methanol etc. The hydrogenolysis is preferably carried out upon a salt of the arylmethyl derivative, e.g. a mineral acid salt such as the hydrochloride, sulphate, perchlorate etc. or an organic acid salt such as the oxalate.

The compounds of skeletal Formula I referred to above exist in a number of stereoisomeric forms and in particular in two series which depend upon the configuration of the hydrogen atoms at the 11b- and 1'-positions. These may be defined for convenience as the A series and B series and have the skeletal formulae shown below.

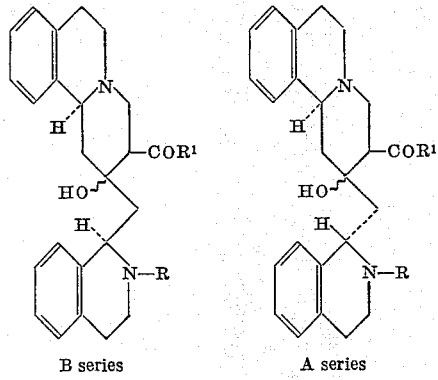

B series    A series

Natural emetine itself lies in the B series and for this reason, those compounds of all the skeletal Formulae I to V are preferred which are in the B series.

For the better understanding of the invention, the following reaction scheme is given showing one process leading to 2-dehydroemetine. The subsequent examples, given by way of illustration only, refer to this scheme in identifying the compounds used (all temperatures are in °C.).

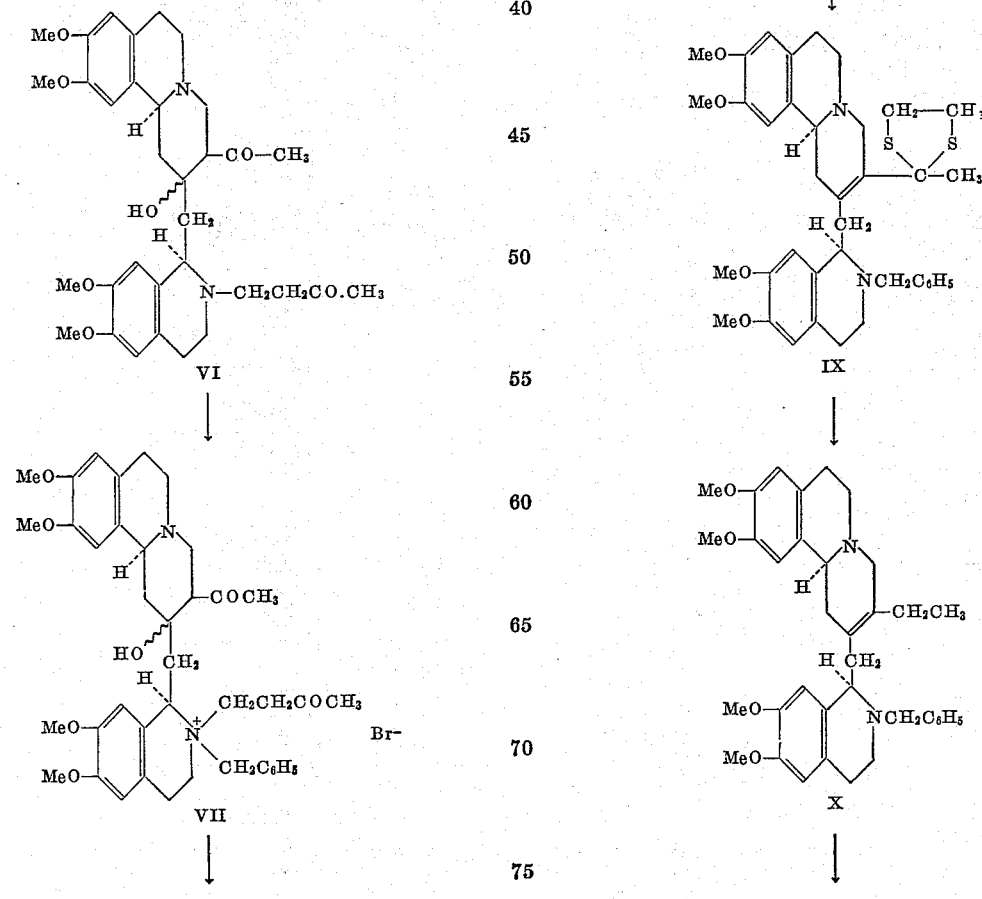

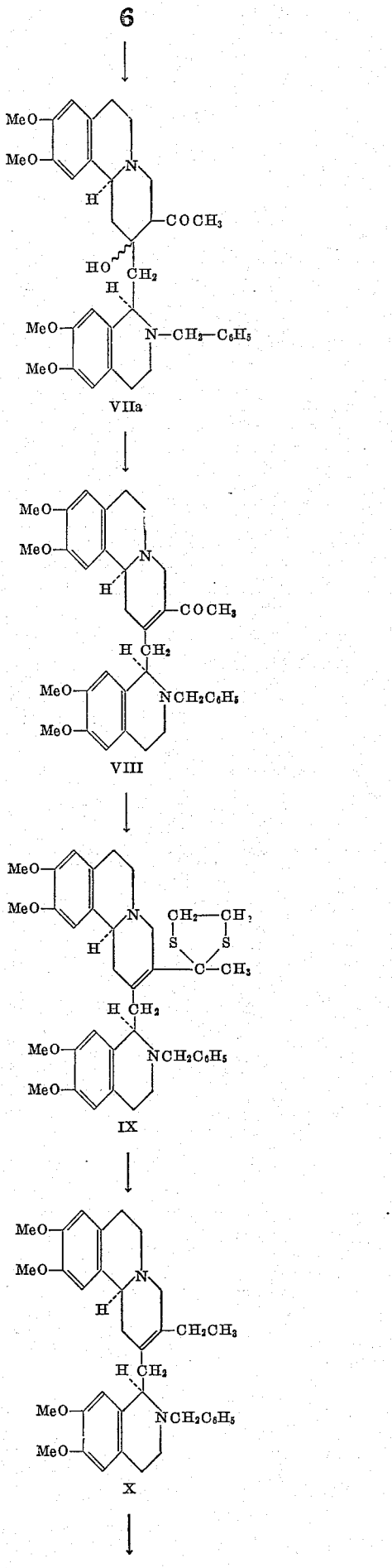

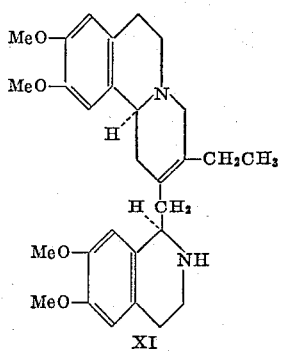

XI

EXAMPLE 1

Quaternization of the alcohol (VI) with benzyl bromide

The alcohol (VI) (2.15 g.) in methylene chloride (50 ml.), containing redistilled benzyl bromide (1.0 ml., 5 mols), was kept at room temperature overnight. Evaporation in vacuo and addition of an excess of ether (50 ml.) gave the quaternary salt (VII) as an amorphous powder (2.82 g., 95%) M.P. 150–155° (decomp.). (Found: Br, 10.8%.) Crystallization from a mixture of 2-methoxyethanol and ether and then from chloroform-ether gave fine colourless needles, M.P. 155–160° (decomp.). (Found: C, 61.1; H, 6.9; Br, 10.75; N, 3.5. $C_{40}H_{51}BrN_2O_7 \cdot 2H_2O$ requires C, 60.9; H, 6.9; Br, 10.2; N, 3.5%.)

The reaction proceeded similarly in acetone solution, but was considerably slower in benzene-methanol (2:1). The yield of (VII) was very similar in all three solvents.

EXAMPLE 2

Conversion of quaternary salt (VII) into 2'-benzyl-compound (VIIa)

The quaternary salt (VII) (2.17 g.) in aqueous dioxane (90 ml., 50%) was treated with a saturated solution of sodium bicarbonate (10 ml.) and the mixture was kept at room temperature for 1½ hr. The solution was concentrated in vacuo, and the residual aqueous suspension was extracted with chloroform (4 x 50 ml.). The extract was dried (MgSO₄), evaporated in vacuo, and the residue treated with ethanolic hydrogen chloride, affording the chromatographically homogeneous hydrochloride of (VIIa) (1.29 g. 68%), M.P. 185–187° (decomp.). The regenerated base, which separated from ethanol in prisms, had M.P. 177–179°.

A similar experiment using 2 N-sodium carbonate gave a 75% yield of the hydrochloride. Experiments using 2 N-ammonium carbonate-acetone (1:1) and 2 N-ammonium hydroxide-acetone (1:1) gave respectively yields of 67 and 75%.

EXAMPLE 3

Dehydration of 2'-benzyl-compound (VIIa)

The hydrochloride of the 2'-benzyl-compound (VIIa) (7.11 g.) was refluxed in 4 N-ethanolic hydrogen chloride (140 ml.) for 1 hr. The ethanol was removed under reduced pressure, the residue dissolved in water (200 ml.), the solution made basic with 40% sodium hydroxide and extracted with benzene and chloroform. Removal of the solvent left a froth (5.85 g., 95%), which crystallized on the addition of a little ether. The α,β-unsaturated ketone (VIII) (4.14 g. 69%) was a pale pink solid, M.P. 138–140°, identical (infra-red and thin-layer chromatography) with an authentic sample.

EXAMPLE 4

Preparation of the ethylene dithioketal (IX)

The α,β-unsaturated ketone (VIII) (2.01 g.) in anhydrous saturated methanolic hydrogen chloride (50 ml.) was treated with ethane-1,2-dithiol (2 ml.) and the mixture was kept at room temperature overnight. The solvent was removed in vacuo and the residue partitioned between water (50 ml.) and benzene (25 ml.). The aqueous phase was washed with further benzene (4 x 25 ml.), basified with concentrated ammonia solution, and the resulting oil isolated with benzene (4 x 25 ml.). The benzene extract was washed with 2 N-sodium hydroxide (2 x 10 ml.) and water (10 ml.), dried (MgSO₄), and the solvent was removed in vacuo, giving the *ethylene thioketal* (IX) as a chromatographically homogeneous froth (2.03 g., 88%). Treatment with ethanolic hydrogen bromide gave the *hydrobromide* which separated from ethanol in almost colourless microcrystals, M.P. 195–200° (decomp.). (Found: C, 51.5; H, 6.4; Br, 17.8; N, 3.0; S, 7.5. $C_{38}H_{46}N_2O_4S_2 \cdot 2HBr \cdot 4H_2O$ requires C, 51.0; H, 6.3; Br, 17.9; N, 3.1; S, 7.2%.)

EXAMPLE 5

(±) N-benzyl-2,3-dehydroemetine (X)

(a) A solution of the ethylene thioketal (IX) (2.50 g.) in dry tetrahydrofuran (10 ml.) was added dropwise to a stirred solution of sodium (1.0 g.) in anhydrous liquid ammonia (150 ml.). The blue colour was discharged with ethanol after ½ hr., water was added, and the excess of ammonia was removed by warming. The residue was partitioned between water (100 ml.) and benzene (50 ml.) and the aqueous layer was further extracted with benzene (4 x 25 ml.). The combined benzene extracts were dried (MgSO₄) and the solvent removed in vacuo, leaving (±) *N-benzyl-2,3-dehydroemetine* as a chromatographically homogenous froth (1.70 g., 80%). Treatment with oxalic acid in acetone solution gave an amorphous salt which crystallized in prisms from water, affording the *oxalate* (1.32 g.), sintering at 140–145°. (Found: C, 60.5; H, 7.2; N, 3.6.

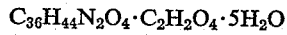

requires C, 60.8; H, 7.5; N, 3.7%.) This salt gave a loss in weight of 12.1% on drying over phosphorus pentoxide at room temperature (5H₂O requires 12.0% loss).

(b) A solution of the ethylene thioketal (IX) (2.41 g.) in a mixture of tetrahydrofuran (10 ml.) and ethanol (90 ml.) was shaken for 2 hr. with freshly prepared W7 Raney nickel (24 ml. suspension) under nitrogen. The catalyst was filtered off and the filtrate was concentrated in vacuo. The residue was dissolved in benzene (50 ml.) and washed with water (3 x 50 ml.). The benzene layer was dried (MgSO₄) and evaporated in vacuo, affording N-benzyl-2,3-dehydroemetine (0.93 g., 45%) of similar quality to material obtained in (a). The derived oxalate was identical with the corresponding salt described above.

EXAMPLE 6

(±) 2,3-dehydroemetine (XI)

(±) N-benzyl-2,3-dehydroemetine oxalate (100 mg.) in aqueous ethanol (5 ml., 50%) was shaken for 2 hr. with palladium-charcoal (25 mg., 10%) in a hydrogen atmosphere at room temperature and pressure. The catalyst was filtered off, the filtrate concentrated in vacuo and then made alkaline with concentrated ammonia solution. The basic product was isolated with benzene as a colourless froth. Treatment with ethanolic hydrogen chloride gave (±) 2,3-dehydroemetine hydrochloride (40 mg., 51%), M.P. 220–225° (decomp.). This salt separated from methanol in prisms, M.P. 225–232° (decomp.), identical with authentic material prepared by an alternative route.

EXAMPLE 7

Quaternization of the alcohol (VI) with methyl iodide

The alcohol (VI) (1.0 g.) in methylene chloride (20 ml.) was treated with methyl iodide (1.0 ml.) at room temperature. After 22 hr. most of the methylene chloride was removed and ether added. The quaternary iodide (1.1 g., 90%) separated as a chromatographically pure solid. (Found: C, 55.0; H, 6.7; I, 17.5.

$$C_{34}H_{47}IN_2O_7$$

requires C, 55.1; N, 6.4; I, 17.1%.)

EXAMPLE 8

Quaternization of the alcohol (VI) with allyl bromide

Treatment of the base with allyl bromide instead of methyl iodide as just described gave the *quaternary bromide* (1.1 g., 91%), as a poorly crystalline solid. This was not obtained analytically pure; thin-layer chromatography showed small amounts of two impurities.

EXAMPLE 9

Decomposition of quaternary methyl compound

The quaternary iodide (0.75 g.) in acetone (40 ml.) was treated at room temperature with 2 N-ammonia (18 ml.) for 24 hr. Most of the solvent was removed, water added, and the mixture extracted with chloroform. The dried chloroform extract gave a residue which was crystallized (charcoal) from ethanol and ether giving the N-methyl compound as colourless crystals, M.P. 171–172°, which were chromatographically pure. (Found: C, 67.4; H, 7.7; N, 5.0. $C_{30}H_{40}N_2O_6 \cdot \frac{1}{2}H_2O$ requires C, 67.5; H, 7.75; N, 5.25.)

EXAMPLE 10

Decomposition of quaternary allyl compound

The quaternary bromide (0.5 g.) in acetone (20 ml.) was treated at room temperature with 2 N ammonia (8 ml.) for 16 hr. and the mixture worked up as in the previous example, giving the *N-allyl compound* as an almost colourless chromatographically pure solid, M.P. 183–185°. (Found: C, 68.7; H, 7.6; N, 5.0.

$$C_{32}H_{42}N_2O_6 \cdot \tfrac{1}{2}H_2O$$

requires C, 68.9; H, 7.7; N, 5.0%.)

EXAMPLE 11

Hydrogenation of N-allyl-compound

The N-allyl-compound (300 mg.) in ethyl acetate solution, shaken with 10% palladium-charcoal (30 mg.) at room temperature and pressure in hydrogen, took up the volume calculated for 1 molecular equivalent. Filtration and concentration gave a solid (300 mg.), M.P. 187–190°. Crystallization from ethyl acetate gave the N-propyl compound, M.P. 193–195°. (Found: C, 69.0; H, 8.05; N, 5.0. $C_{32}H_{44}N_2O_6$ requires C, 69.5; H, 8.0; N, 5.1%.) Infra red analysis showed that the allyl group had been reduced.

We claim:

1. A process as claimed in claim 13 in which the quaternization reaction is effected in the presence of an inert solvent selected from the group consisting of benzene, toluene, methylene dichloride, chloroform, acetonitrile and nitromethane.

2. A process as claimed in claim 13 in which the removal of the 3-oxoalkyl substituent is effected in alkanolic mineral acid.

3. A process is claimed in claim 2 in which the removal of the 3-oxoalkyl substituent is effected in the presence of a member selected from the group consisting of ethanolic hydrogen chloride or ethanolic sulphuric acid.

4. A process as claimed in claim 13 in which the removal of the 3-oxoalkyl substituent is effected in the presence of a member selected from the group consisting of an alkali metal hydroxide, ammonium hydroxide, alkali metal carbonate and alkali metal bicarbonate.

5. A process as claimed in claim 13 in which the removal of the 3-oxoalkyl substituent is effected with hydrazine.

6. A process as claimed in claim 5 in which the removal of the 3-oxoalkyl substituent is effected in aqueous solution.

7. A process as claimed in claim 6 in which the removal of the 3-oxoalkyl substituent is effected in the presence of a water-miscible organic solvent.

8. A process as claimed in claim 7 in which said solvent is selected from the group consisting of methanol, ethanol, acetone and dioxane.

9. A process as claimed in claim 13 where $R^2$ is benzyl; R is methoxy in the 6′, 7′, 9 and 10 positions and hydrogen in the remaining positions; $R^1$ is methyl and $R^3$ is $COR^1$.

10. A process as claimed in claim 13 where R, is methoxy at the 6′, 7′, 9 and 10 positions and hydrogen at the remaining positions; $R^1$ is methyl; $R^2$ is benzyl; $R^3$ is —$COR^1$ and X is sulphate, p-toluene sulfonate or halide.

11. A process as claimed in claim 10 where X is bromine.

12. A process as claimed in claim 13 in which the basic agent for removal of the 3-oxoalkyl substituent is sodium bicarbonate.

13. A process for the preparation of compounds useful as intermediates in the synthesis of emetine, 2-dehydroemetine and related compounds, comprising the steps of reacting a compound of the formula selected from the group consisting of

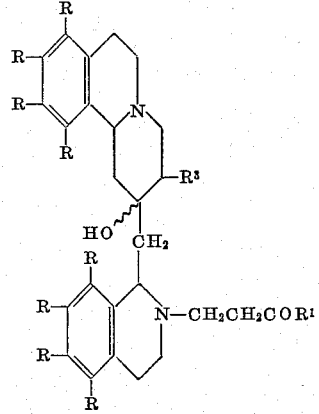

and

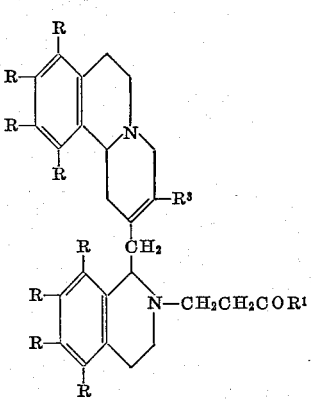

where R is hydrogen, lower alkoxy or methylene dioxy; $R^1$ is lower alkyl monocarbocyclic aryl methyl or monocarbocyclic aryl and $R^3$ is —$CH_2R^1$ or —$COR^1$ with the compound $R^2X$ where $R^2$ is monocarbocyclic aryl methyl, lower alkyl, lower hydroxy alkyl or lower alkenyl and X is an anion forming group to form a quaternary compound having a cation of the formula selected from the group consisting of

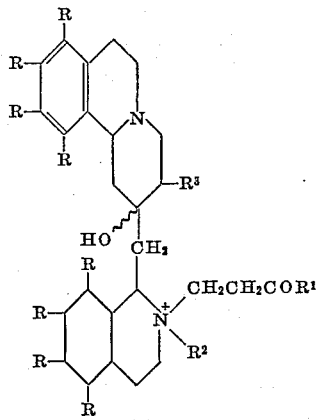

and

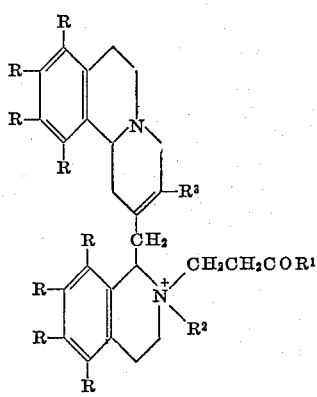

where R, R¹, R² and R³ have the above meanings and removing the 3-oxoalkyl from the 2'-position to form a compound of the formula selected from the group consisting of

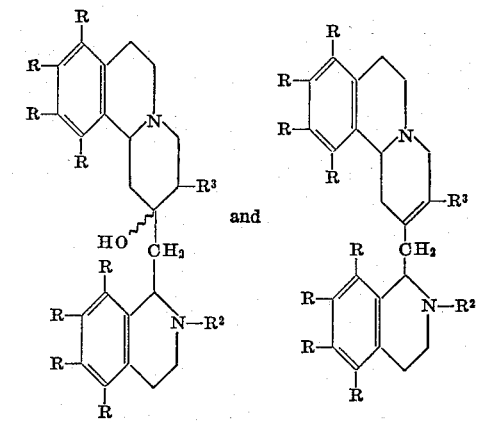

References Cited by the Examiner

UNITED STATES PATENTS

| | | | |
|---|---|---|---|
| 2,681,910 | 6/1954 | Burckhalter | 260—288 |
| 2,922,786 | 1/1960 | Sam et al. | 260—288 |
| 2,974,143 | 5/1961 | Schmidt et al. | 260—288 |
| 3,121,720 | 2/1964 | Barton et al. | 260—288 |
| 3,121,722 | 2/1964 | Ritchie et al. | 260—288 |

OTHER REFERENCES

Albert, the "Acridines," Arnold 1951, pp. 190–191 relied upon.

Battersby et al., J. Chem. Soc. (London), pp. 2704–2710, p. 2705.

Brossi et al., Hev. Chim. Acta., vol. 42, pp. 772–88 (1959).

ALEX MAZEL, *Primary Examiner.*

NICHOLAS S. RIZZO, HENRY R. JILES, *Examiners.*

DON. M. KERR, DONALD G. DAUS,
*Assistant Examiners.*